(12) United States Patent  
Okubo et al.

(10) Patent No.: US 9,134,888 B2  
(45) Date of Patent: Sep. 15, 2015

(54) UI CREATION SUPPORT SYSTEM, UI CREATION SUPPORT METHOD, AND NON-TRANSITORY STORAGE MEDIUM

(75) Inventors: Ryosuke Okubo, Tokyo (JP); Shunsuke Suzuki, Tokyo (JP); Yukiko Tanikawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 224 days.

(21) Appl. No.: 13/982,192

(22) PCT Filed: Nov. 29, 2011

(86) PCT No.: PCT/JP2011/006632  
§ 371 (c)(1),  
(2), (4) Date: Jul. 26, 2013

(87) PCT Pub. No.: WO2012/101701  
PCT Pub. Date: Aug. 2, 2012

(65) Prior Publication Data  
US 2013/0326378 A1  Dec. 5, 2013

(30) Foreign Application Priority Data

Jan. 27, 2011  (JP) .................................. 2011-015240

(51) Int. Cl.  
*G06F 3/0481* (2013.01)  
*G06F 3/0484* (2013.01)  
*G06F 9/44* (2006.01)

(52) U.S. Cl.  
CPC ................ *G06F 3/0484* (2013.01); *G06F 8/38* (2013.01)

(58) Field of Classification Search  
CPC .................................. G06F 8/34; G06F 3/0481

USPC ......................................................... 715/763  
See application file for complete search history.

(56) References Cited

U.S. PATENT DOCUMENTS

| | | | |
|---|---|---|---|
| 5,956,029 A * | 9/1999 | Okada et al. ................... | 715/746 |
| 6,014,638 A * | 1/2000 | Burge et al. ................... | 705/7.29 |
| 6,484,149 B1 * | 11/2002 | Jammes et al. ............. | 705/26.62 |
| 6,687,787 B1 * | 2/2004 | Richardson et al. .......... | 711/114 |
| 7,426,734 B2 * | 9/2008 | Debique et al. ............... | 719/310 |

(Continued)

FOREIGN PATENT DOCUMENTS

| | | |
|---|---|---|
| JP | 2000-250723 A | 9/2000 |
| JP | 2001-117688 A | 4/2001 |

(Continued)

OTHER PUBLICATIONS

International Search Report for PCT/JP2011/006632, dated Feb. 28, 2012.

*Primary Examiner* — Reza Nabi  
(74) *Attorney, Agent, or Firm* — Sughrue Mion, PLLC

(57) ABSTRACT

A UI creation support system is provided which supports creating a user interface (UI) screen for receiving an input of each of a plurality of items, the UI creation support system (1) including a UI configuration determining unit (10) that arranges graphical user interface (GUI) components for receiving an input of each of the plurality of items and item-relevant information pieces which are information pieces relevant to the plurality of items which are displayed in correlation with the GUI components on the UI screen, adjusts an amount of the item-relevant information pieces to be arranged on the UI screen depending on an assumed user using the UI screen, and determines a configuration of the UI screen for the assumed user.

4 Claims, 18 Drawing Sheets

(56) References Cited

U.S. PATENT DOCUMENTS

| | | | |
|---|---|---|---|
| 7,523,231 B1* | 4/2009 | Gupta et al. | 710/36 |
| 7,620,903 B1* | 11/2009 | Rasmussen et al. | 715/762 |
| 7,634,567 B1* | 12/2009 | Wood et al. | 709/226 |
| 7,680,901 B2* | 3/2010 | Rechterman et al. | 709/219 |
| 7,877,703 B1* | 1/2011 | Fleming | 715/800 |
| 8,209,638 B2* | 6/2012 | Hoff et al. | 715/866 |
| 8,239,584 B1* | 8/2012 | Rabe et al. | 710/8 |
| 8,418,072 B1* | 4/2013 | Bauer et al. | 715/764 |
| 8,533,604 B1* | 9/2013 | Parenti et al. | 715/743 |
| 8,631,330 B1* | 1/2014 | Hwang et al. | 715/736 |
| 2003/0046401 A1* | 3/2003 | Abbott et al. | 709/228 |
| 2003/0172020 A1* | 9/2003 | Davies et al. | 705/36 |
| 2003/0200531 A1* | 10/2003 | Fairweather | 717/114 |
| 2004/0267723 A1* | 12/2004 | Bharat | 707/3 |
| 2005/0144162 A1* | 6/2005 | Liang | 707/3 |
| 2006/0228654 A1* | 10/2006 | Sanjar et al. | 430/438 |
| 2008/0109276 A1* | 5/2008 | Ionfrida et al. | 705/7 |
| 2008/0141174 A1* | 6/2008 | Kodosky et al. | 715/835 |
| 2008/0263462 A1* | 10/2008 | Mayer-Ullmann et al. | 715/762 |
| 2009/0106674 A1* | 4/2009 | Bray et al. | 715/762 |
| 2009/0132537 A1* | 5/2009 | Denton | 707/9 |
| 2009/0300060 A1* | 12/2009 | Beringer et al. | 707/103 R |
| 2012/0265744 A1* | 10/2012 | Berkowitz et al. | 707/705 |
| 2013/0305176 A1* | 11/2013 | Okubo et al. | 715/765 |
| 2013/0311915 A1* | 11/2013 | Suzuki et al. | 715/763 |
| 2013/0326378 A1* | 12/2013 | Okubo et al. | 715/763 |
| 2014/0040759 A1* | 2/2014 | Okubo et al. | 715/744 |
| 2014/0229867 A1* | 8/2014 | Suzuki et al. | 715/762 |

FOREIGN PATENT DOCUMENTS

| | | |
|---|---|---|
| JP | 2004-021580 A | 1/2004 |
| JP | 2004-355418 A | 12/2004 |
| JP | 2006-338233 A | 12/2006 |
| JP | 2007-004444 A | 1/2007 |

* cited by examiner

FIG. 2

| ORDERING SYSTEM | RETURN TO MENU  HELP  LOGOUT |

■ BASIC INFORMATION
 ◆ REQUEST DEPARTMENT
REQUEST INFORMATION
PRODUCT NAME [      ]   PRODUCT NUMBER [      ]   PRODUCT TYPE [     ▼]

SUPPLIER
SUPPLIER CODE [            ]        SUPPLIER NAME [      ]

SUM
TOTAL SUPPLY [      ]   TAX [        ]   SCORE [   ]

◆ MATERIAL DEPARTMENT
RECEIPT
RECEIPT DATE [    ]🔲   RECEIPT TIME [     ]   RECEIPT LOCATION [     ]

INSPECTION METHOD
TYPE [     ▼]   DESIGNATED AUTHENTICATION ⊙YES ○NO   MEDIUM TYPE [     ▼]

■ REQUESTER INFORMATION
 ◆ EMPLOYEE INFORMATION
REQUESTER
EMPLOYEE CODE [      ]        REQUESTER NAME [      ]

FIG. 3

| ORDERING SYSTEM | RETURN TO MENU   HELP   LOGOUT |

■ BASIC INFORMATION

◆ REQUEST DEPARTMENT

| PRODUCT NAME | | PRODUCT NUMBER | | PRODUCT TYPE | ▼ |

| SUPPLIER CODE | | | SUPPLIER NAME | |

| TOTAL SUPPLY | | TAX | | SCORE | |

◆ MATERIAL DEPARTMENT

| RECEIPT DATE | | | RECEIPT TIME | | RECEIPT LOCATION | |

| TYPE | ▼ | DESIGNATED AUTHENTICATION ⦿YES ○NO | MEDIUM TYPE | ▼ |

■ REQUESTER INFORMATION

◆ EMPLOYEE INFORMATION

| EMPLOYEE CODE | | REQUESTER NAME | |

◆ CONTACT INFORMATION

| MAIL ADDRESS 1 | | MAIL ADDRESS 2 | |

| EXTENSION NUMBER | | REPRESENTATIVE NUMBER | |

■ DELIVERY DESTINATION PERSON INFORMATION

FIG. 4

| ORDERING SYSTEM | RETURN TO MENU  HELP  LOGOUT |

■ BASIC INFORMATION

| PRODUCT NAME | | PRODUCT NUMBER | | PRODUCT TYPE | ▼ |
| SUPPLIER CODE | | | SUPPLIER NAME | |
| TOTAL SUPPLY | | TAX | | SCORE | |
| RECEIPT DATE | 📅 | RECEIPT TIME | | RECEIPT LOCATION | |
| TYPE | ▼ | DESIGNATED AUTHENTICATION | ⦿YES ○NO | MEDIUM TYPE | ▼ |

■ REQUESTER INFORMATION

| EMPLOYEE CODE | | REQUESTER NAME | |
| MAIL ADDRESS 1 | | MAIL ADDRESS 2 | |
| EXTENSION NUMBER | | REPRESENTATIVE NUMBER | |

■ DELIVERY DESTINATION PERSON INFORMATION

| EMPLOYEE CODE | | DELIVERY DESTINATION PERSON NAME | |
| DEPARTMENT | ▼ | SECTION | ▼ |
| POSTAL CODE | | PROVINCE/ PREFECTURE | ▼ | CITY/VILLAGE | |
| DETAILED ADDRESS | | BUILDING NAME | |

FIG. 5

| CLASSIFICATION 1 | CLASSIFICATION 2 | CLASSIFICATION 3 | ITEM NAME | DETAILS |
|---|---|---|---|---|
| BASEIC INFORMATION | REQUEST DEPARTMENT | REQUEST INFORMATION | PRODUCT NAME | TEXT BOX |
| | | | PRODUCT NUMBER | TEXT BOX |
| | | | PRODUCT TYPE | DROP-DOWN LIST |
| | | SUPPLIER | SUPPLIER CODE | TEXT BOX |
| | | | SUPPLIER NAME | TEXT BOX |
| | | SUM | TOTAL SUPPLY | TEXT BOX |
| | | | TAX | TEXT BOX |
| | | | SCORE | TEXT BOX |
| | MATERIAL DEPARTMENT | RECEIPT | RECEIPT DATE | CALENDAR |
| | | | RECEIPT TIME | TEXT BOX |
| | | | RECEIPT LOCATION | TEXT BOX |
| | | INSPECTION METHOD | TYPE | DROP-DOWN LIST |
| | | | DESIGNATED AUTHENTICATION | RADIO BUTTON |
| | | | MEDIUM TYPE | DROP-DOWN LIST |
| REQUESTER INFORMATION | EMPLOYEE INFORMATION | REQUESTER | EMPLOYEE CODE | TEXT BOX |
| | | | REQUESTER NAME | TEXT BOX |
| | CONTACT INFORMATION | MAIL ADDRESS | MAIL ADDRESS 1 | TEXT BOX |
| | | | MAIL ADDRESS 2 | TEXT BOX |
| | | PHONE NUMBER | EXTENSION NUMBER | TEXT BOX |
| | | | REPRESENTATIVE NUMBER | TEXT BOX |
| DELIVERY DESTINATION PERSON INFORMATION | EMPLOYEE INFORMATION | DELIVERY DESTINATION PERSON | EMPLOYEE CODE | TEXT BOX |
| | | | DELIVERY DESTINATION PERSON NAME | TEXT BOX |
| | LOCATION | AFFILIATION | DEPARTMENT | DROP-DOWN LIST |
| | | | SECTION | DROP-DOWN LIST |
| | | ADDRESS | POSTAL CODE | TEXT BOX |
| | | | PROVINCE/PREFECTURE | DROP-DOWN LIST |
| | | | CITY/VILLAGE | TEXT BOX |
| | | | DETAILED ADDRESS | TEXT BOX |
| | | | BUILDING NAME | TEXT BOX |
| | CONTACT INFORMATION | MAIL ADDRESS | MAIL ADDRESS 1 | TEXT BOX |
| | | | MAIL ADDRESS 2 | TEXT BOX |
| | | PHONE NUMBER | EXTENSION NUMBER | TEXT BOX |
| | | | REPRESENTATIVE NUMBER | TEXT BOX |

FIG. 7

| ORDERING SYSTEM | RETURN TO MENU  HELP  LOGOUT |

■ BASIC INFORMATION

| PRODUCT NAME | | PRODUCT NUMBER | | PRODUCT TYPE | ▼ |
| SUPPLIER CODE | | | | SUPPLIER NAME | |
| TOTAL SUPPLY | | TAX | | SCORE | |
| RECEIPT DATE | | RECEIPT TIME | | RECEIPT LOCATION | |
| TYPE | ▼ | DESIGNATED AUTHENTICATION | ⊙YES ○NO | MEDIUM TYPE | ▼ |

■ REQUESTER INFORMATION

| EMPLOYEE CODE | | REQUESTER NAME | |
| MAIL ADDRESS 1 | | MAIL ADDRESS 2 | |
| EXTENSION NUMBER | | REPRESENTATIVE NUMBER | |

■ DELIVERY DESTINATION PERSON INFORMATION

| EMPLOYEE CODE | | DELIVERY DESTINATION PERSON NAME | |
| DEPARTMENT | ▼ | SECTION | ▼ |
| POSTAL CODE | | PROVINCE/ PREFECTURE | ▼ | CITY/VILLAGE | |
| DETAILED ADDRESS | | BUILDING NAME | | | TO NEXT PAGE |

FIG. 8

| ORDERING SYSTEM | RETURN TO MENU  HELP  LOGOUT |

■ BASIC INFORMATION

| PRODUCT NAME | | PRODUCT NUMBER | |
| PRODUCT TYPE | ▼ | | |
| SUPPLIER CODE | | SUPPLIER NAME | |
| TOTAL SUPPLY | | TAX | |
| SCORE | | | |
| RECEIPT DATE | | RECEIPT TIME | |
| RECEIPT LOCATION | | | |
| TYPE | ▼ | DESIGNATED AUTHENTICATION | ⦿YES ○NO |
| MEDIUM TYPE | ▼ | | |

■ REQUESTER INFORMATION

| EMPLOYEE CODE | | REQUESTER NAME | |
| MAIL ADDRESS 1 | | MAIL ADDRESS 2 | |
| EXTENSION NUMBER | | REPRESENTATIVE NUMBER | |

■ DELIVERY DESTINATION PERSON INFORMATION

FIG. 9

```
≡ ORDERING SYSTEM                    RETURN TO MENU  HELP  LOGOUT

■ BASIC INFORMATION

PRODUCT NAME        [            ]
  PRODUCT NUMBER      [            ]
  PRODUCT TYPE        [        ▼]
  SUPPLIER CODE       [                   ]
  SUPPLIER NAME       [            ]
  TOTAL SUPPLY        [            ]
  TAX                 [            ]
  SCORE               [     ]
  RECEIPT DATE        [            ] 🗓
  RECEIPT TIME        [            ]
  RECEIPT LOCATION    [            ]
  TYPE                [        ▼]
  DESIGNATED
  AUTHENTICATION      ⊙ YES  ○ NO
  MEDIUM TYPE         [        ▼]
```

FIG. 10 (a)

| ORDERING SYSTEM | RETURN TO MENU   HELP   LOGOUT |

■ BASIC INFORMATION

| PRODUCT NAME | | PRODUCT NUMBER | | PRODUCT TYPE | ▼ |
| SUPPLIER CODE | | | | SUPPLIER NAME | |
| TOTAL SUPPLY | | TAX | | SCORE | |
| RECEIPT DATE | | RECEIPT TIME | | RECEIPT LOCATION | |
| TYPE | ▼ | DESIGNATED AUTHENTICATION | ⊙YES ○NO | MEDIUM TYPE | ▼ |

TO NEXT PAGE

FIG. 10(c)

≡ ORDERING SYSTEM     RETURN TO MENU   HELP   LOGOUT

■ DELIVERY DESTINATION PERSON INFORMATION

| EMPLOYEE CODE | | DELIVERY DESTINATION PERSON NAME | |
| DEPARTMENT | ▼ | SECTION | ▼ |
| POSTAL CODE | | PROVINCE/PREFECTURE | ▼ | CITY/VILLAGE | |
| DETAILED ADDRESS | | BUILDING NAME | |

TO PREVIOUS PAGE    TO NEXT PAGE

FIG. 11(b)

```
≡ ORDERING SYSTEM                                    RETURN TO MENU   HELP   LOGOUT
```

■ BASIC INFORMATION (2/2)

| RECEIPT DATE | [        ] 🔲 | RECEIPT TIME | [        ] | RECEIPT LOCATION | [        ] |
| TYPE | [        ] ▼ | DESIGNATED AUTHENTICATION | ⦿YES ○NO | MEDIUM TYPE | [        ] ▼ |

TO PREVIOUS PAGE   TO NEXT PAGE

FIG. 11(c)

```
ORDERING SYSTEM                          RETURN TO MENU  HELP  LOGOUT

■ REQUESTER INFORMATION (1/2)
  EMPLOYEE CODE  [        ]      REQUESTER NAME  [        ]
                                          [TO PREVIOUS PAGE]  [TO NEXT PAGE]
```

FIG. 11(e)

```
ORDERING SYSTEM                              RETURN TO MENU  HELP  LOGOUT

■ DELIVERY DESTINATION PERSON INFORMATION (1/2)

EMPLOYEE CODE  [         ]     DELIVERY DESTINATION  [         ]
                                 PERSON NAME
  DEPARTMENT     [       ▼ ]     SECTION               [       ▼ ]

TO PREVIOUS    TO NEXT PAGE
                                             PAGE
```

FIG. 11(f)

```
≡ ORDERING SYSTEM                              RETURN TO MENU   HELP   LOGOUT

■ DELIVERY DESTINATION PERSON INFORMATION (2/2)

POSTAL CODE  [        ]   PROVINCE/      [        ▼]   CITY/VILLAGE  [        ]
                            PREFECTURE
  DETAILED     [        ]   BUILDING       [              ]
  ADDRESS                   NAME

TO PREVIOUS    TO NEXT PAGE
                                                 PAGE
```

UI CREATION SUPPORT SYSTEM, UI CREATION SUPPORT METHOD, AND NON-TRANSITORY STORAGE MEDIUM

CROSS REFERENCE TO RELATED APPLICATIONS

This application is a National Stage of International Application No. PCT/JP2011/006632filed Nov. 29, 2011, claiming priority based on Japanese Patent Application No. 2011-015240 filed Jan. 27, 2011, the contents of all of which are incorporated herein by reference in their entirety.

TECHNICAL FIELD

The present invention relates to a UI creation support system, a UI creation support method, and a program.

BACKGROUND ART

A designer of a UI screen needs to understand how a user (hereinafter, referred to as an "assumed user") will use the UI screen and to design the UI screen suitable for the assumed user. However, it is not easy to design a UI screen suitable for an assumed user.

Patent Document 1 discloses a technique of choosing components to be arranged on a UI screen depending on a user and creating a UI screen for the user in which only the selected components are arranged. Specifically, a technique of decreasing the number of components to be displayed on a UI screen and displaying GUI components capable of being easily operated when a level of proficiency of a user at a system is low, and adding components to be displayed on the UI screen when the level of proficiency of the user at the system increases is disclosed.

Patent Document 2 discloses a technique of choosing help information to be provided depending on a user and displaying only the selected help information on a display unit in a system having a function of providing the help information when the help information is requested by the user.

Patent Document 3 discloses a data processing apparatus that is configured to automatically change setting of a UI and changes the size of icons displayed in a tool bar or chooses a menu to be displayed depending on a user's operation skill.

Patent Document 4 discloses a UI apparatus that registers information on whether a user support such as an enlarged display of characters is necessary for users or for screens to be displayed on the apparatus and that creates a UI screen for each user. Audio guidance, display of a monochromatic screen for color blinders, and the like are described as the user support.

RELATED DOCUMENT

Patent Document

[Patent Document 1] Japanese Unexamined Patent Publication No. 2004-355418
[Patent Document 2] Japanese Unexamined Patent Publication No. 2001-117688
[Patent Document 3] Japanese Unexamined Patent Publication No. 2004-21580
[Patent Document 4] Japanese Unexamined Patent Publication No. 2007-4444

DISCLOSURE OF THE INVENTION

Since the operability of a UI screen affects processing efficiency and correctness of data input or the like, it is very important to design a UI screen which can be easily manipulated by a user. The inventors found that the type and the amount of information to be described on a UI screen affect the operability of the UI screen and that the level of affection varies depending on a user.

A unit that chooses information to be displayed on a UI screen depending on an assumed user can be considered as for a unit capable of improving the operability of a UI screen, similar to the techniques disclosed in Patent Documents 1, 2, and 3. However, it is difficult to select information to be kept on the UI screen and information to be deleted from the UI screen and thus a UI screen difficult to manipulate is obtained with erroneous selection. The technique disclosed in Patent Document 4 is not configured to choose information to be displayed on a UI screen.

Therefore, an object of the present invention is to provide a technique of appropriately choosing information to be displayed on a UI screen depending on an assumed user and determining a configuration of the UI screen suitable for the assumed user.

According to an aspect of the present invention, there is provided a UI creation support system that supports creation of a user interface (UI) screen for receiving an input of each of a plurality of items, the UI creation support system including: a UI configuration determining unit that arranges graphical user interface (GUI) components for receiving an input of each of the plurality of items and item-relevant information pieces which are information pieces relevant to the plurality of items which are displayed in correlation with the GUI components on the UI screen, that adjusts an amount of the item-relevant information pieces to be arranged on the UI screen depending on an assumed user using the UI screen, and that determines a configuration of the UI screen for the assumed user.

According to another aspect of the present invention, there is provided a UI creation support method of supporting creation of a UI screen for receiving an input of each of a plurality of items, the UI creation support method including: a UI configuration determining step of arranging GUI components for receiving an input of each of the plurality of items and item-relevant information pieces which are information pieces relevant to the plurality of items which are displayed in correlation with the GUI components on the UI screen, adjusting an amount of the item-relevant information pieces to be arranged on the UI screen depending on an assumed user using the UI screen, and determining a configuration of the UI screen for the assumed user.

According to still another aspect of the present invention, there is provided a program for supporting creation of a UI screen for receiving an input of each of a plurality of items, the program causing a computer to serve as: a UI configuration determining unit that arranges GUI components for receiving an input of each of the plurality of items and item-relevant information pieces which are information pieces relevant to the plurality of items which are displayed in correlation with the GUI components on the UI screen, that adjusts an amount of the item-relevant information pieces to be arranged on the UI screen depending on an assumed user using the UI screen, and that determines a configuration of the UI screen for the assumed user.

According to the aspects of the present invention, it is possible to appropriately choose information to be displayed on a UI screen depending on an assumed user and to determine a configuration of the UI screen suitable for the assumed user.

BRIEF DESCRIPTION OF THE DRAWINGS

The above-mentioned object and other objects, features, and advantages will become apparent with reference to the following exemplary embodiments and the accompanying drawings.

FIG. 2 is a diagram illustrating an example a UI screen realized by the UI creation support system according to the embodiment.

FIG. 3 is a diagram illustrating an example of a UI screen realized by the UI creation support system according to the embodiment.

FIG. 4 is a diagram illustrating an example of a UI screen realized by the UI creation support system according to the embodiment.

FIG. 5 is a diagram illustrating an example of a UI component holding unit according to the embodiment.

FIG. 7 is a diagram illustrating an example of a UI screen realized by the UI creation support system according to the embodiment.

FIG. 8 is a diagram illustrating an example of a UI screen realized by the UI creation support system according to the embodiment.

FIG. 9 is a diagram illustrating an example of a UI screen realized by the UI creation support system according to the embodiment.

FIG. 10(a) is a diagram illustrating an example of a UI screen realized by the UI creation support system according to the embodiment.

FIG. 10(c) is a diagram illustrating an example of a UI screen realized by the UI creation support system according to the embodiment.

FIG. 11(b) is a diagram illustrating an example of a UI screen realized by the UI creation support system according to the embodiment.

FIG. 11(c) is a diagram illustrating an example of a UI screen realized by the UI creation support system according to the embodiment.

FIG. 11(e) is a diagram illustrating an example of a UI screen realized by the UI creation support system according to the embodiment.

FIG. 11(f) is a diagram illustrating an example of a UI screen realized by the UI creation support system according to the embodiment.

DESCRIPTION OF EMBODIMENTS

Figure 1:
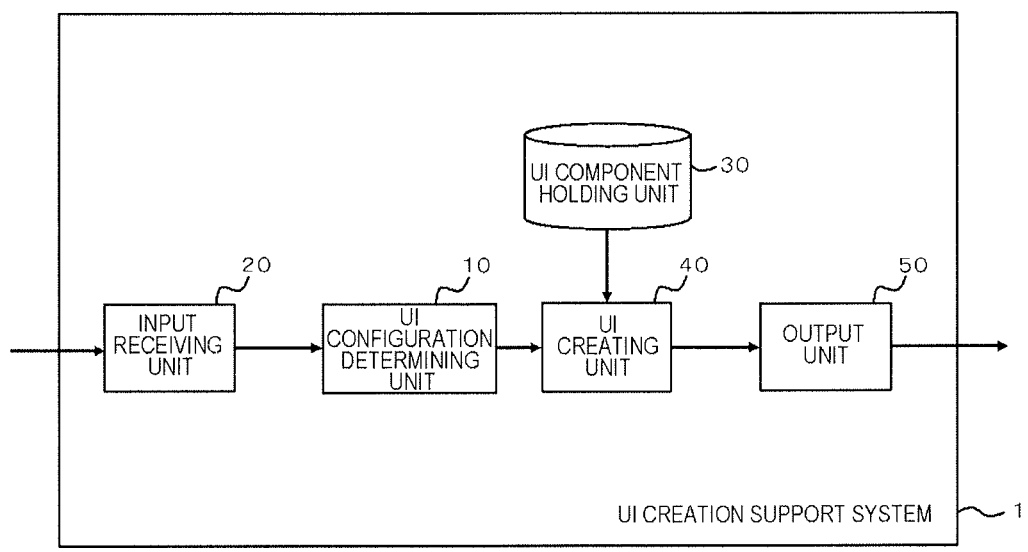
FIG. 1 is a functional block diagram illustrating a UI creation support system according to an embodiment.

Hereinafter, embodiments of the present invention will be described with reference to the accompanying drawings.

Units in the embodiments are embodied by any combination of hardware and software based on a CPU and a memory of a computer, a program (including a program downloaded from a storage medium such as a CD or a server in the Internet or the like, in addition to a program stored in advance in the memory at the shipment thereof) loaded into the memory, a storage unit such as a hard disk storing the program, and a network access interface. It will be understood by those skilled in the art that the method and apparatus for embodiment thereof can be modified in various forms.

The functional block diagrams used to describe the embodiments do not show blocks of hardware units but blocks of functional units. In the drawings, each unit according to the embodiments is shown to be embodied by a single device, but the embodiment means thereof is not limited thereto. That is, the configurations may be divided physically or may be divided logically.

First Embodiment

FIG. 1 is a functional block diagram illustrating an example of a configuration of a UI creation support system 1 according to this embodiment, as shown in the drawing, the UI creation support system 1 according to this embodiment includes a UI configuration determining unit 10. The UI creation support system 1 according to this embodiment may further include an input receiving unit 20, a UI component holding unit 30, a UI creating unit 40, and an output unit 50.

The UI creation support system 1 supports creation of a UI screen for receiving input of plural items. In the UI screen for receiving input of plural items, for example, as shown in FIG. 2, graphical user interface (GUI) components (such as text boxes, radio buttons, drop-down lists) corresponding to the items are displayed and information (hereinafter, referred to as "item-relevant information") is also displayed in correlation with the GUI components.

The "item-relevant information" in this embodiment includes item identification information pieces for identifying plural items and information pieces for identifying groups into which the item identification information pieces are classified. That is, the item-relevant information has a hierarchical structure including a lower layer of the item identification information pieces and at least one upper layer of groups into which the item identification information pieces are classified.

In the example shown in FIG. 2, product name, product number, product type, supplier code, and the like are shown as the item identification information pieces. Basic information, requester information, request department, material department, employee information, request information, supplier, and the like are shown as the information for identifying the groups into which the item identification information pieces are classified. In the text box located at the left-top of the UI screen, four item-relevant information pieces of "■ basic information", "♦ request department", "request information", and "product name" are correlated with each other. In the text box located on the right side thereof, four item-relevant information pieces of "■ basic information", "♦ request department", "request information", and "product number" are correlated with each other.

A user manipulating a UI screen manipulates the GUI components on the basis of the item-relevant information displayed on the UI screen, grasps details to be input, and inputs predetermined information.

FIG. 5 shows an example of item-relevant information displayed on the UI screen shown in FIG. 2. In the example shown in FIG. 5, item identification information pieces are described in a section of "item name". Types of the GUI components to be displayed on the UI screen are described in a section of "details" in correlation with the item names. Upper layers including groups into which the item identification information pieces are classified are described in sections of "classification 1" to "classification 3". In the example shown in FIG. 5, there are three upper layers as layers higher than the item identification information.

It is thought that a user having a high level of proficiency at a service for receiving an input of information from the UI screen, particularly, a user having a high level of proficiency at work of inputting information from the UI screen, can manipulate the GUI components and easily grasp details to be input even when a lot of item-relevant information pieces are not displayed on the UI screen. Rather, the UI screen may be enlarged because unnecessary item-relevant information pieces are displayed on the UI screen, and disadvantages like an unnecessary scroll displaying operation may be caused, thereby causing degradation in processing efficiency.

On the other hand, it is thought that a user having a low level of proficiency at the service for receiving an input of information from the UI screen, particularly, a user having a low level of proficiency at work of inputting information from the UI screen, can manipulate the GUI components and easily grasp details to be input, when a lot of item-relevant information pieces are displayed on the UI screen. For example, as shown in FIG. 2, when plural items are displayed along with hierarchical information, a user can group plural items into groups using the hierarchical information and can perform an input operation step by step, thereby expecting improvement in processing efficiency and correctness.

Therefore, the UI creation support system 1 according to this embodiment is configured to adjust an amount of item-relevant information to be displayed on a UI screen depending on an assumed user and to determine the configuration of the UI screen for the assumed user. Units for realizing this configuration will be described below.

The UI configuration determining unit 10 determines the configuration of a UI screen depending on an assumed user. Specifically, the UI configuration determining unit 10 determines the configuration of a UI screen in which GUI components for receiving inputs of plural items and item-relevant information pieces to be displayed in correlation with the GUI components are arranged on the UI screen. The types and the number of GUI components to be arranged on the UI screen and the details of the item-relevant information pieces are not particularly limited, and are design matters which can be determined on the basis of use scenes, usages, and the like of the UI screen.

The UI configuration determining unit 10 adjusts the amount of item-relevant information pieces arranged on the UI screen depending on an assumed user using the UI screen and determines the configuration of the UI screen for the assumed user.

For example, when a UI screen is a UI screen for inputting information on a predetermined service and a level of proficiency of an assumed user at the predetermined service, particularly, a level of proficiency at work of inputting information from the UI screen, is low, the UI configuration determining unit 10 determines a configuration of the UI screen in which an amount of item-relevant information pieces to be arranged is large as the UI screen for the assumed user. On the other hand, when the level of proficiency of the assumed user at the predetermined service, particularly, the level of proficiency at work of inputting information from the UI screen, is high, the UI configuration determining unit 10 determines a configuration of the UI screen in which an amount of item-relevant information pieces to be arranged is small as the UI screen for the assumed user.

Here, configuration examples of the UI screen which is determined by causing the UI configuration determining unit 10 to adjust the amount of item-relevant information pieces to be arranged on the UI screen depending on an assumed user are shown in FIGS. 2 to 4.

FIGS. 2 to 4 show UI screens in which the item-relevant information pieces and the GUI components shown in FIG. 5 are arranged. As described above, the item-relevant information pieces shown in FIG. 5 include item identification information pieces described in a section of "item name" and information pieces for identifying groups into which the item identification information pieces are classified and which are described in sections of "classification 1" to "classification 3". The item-relevant information have a hierarchical structure including a lower layer of the item identification information pieces and an upper layer of groups described in "classification 1" to "classification 3". The number of upper layers has only to be set to at least one and is design matters. How to classify the item identification information pieces is also design matters.

In the UI screen shown in FIG. 2, all the upper layers of "classification 1" to "classification 3" are displayed in addition to the item identification information pieces. The UI configuration determining unit 10 can determine the configuration of the UI screen in which all the upper layers are displayed and which is shown in FIG. 2 as a UI screen for a first assumed user of which the level of proficiency at the predetermined service, particularly, the level of proficiency at work of inputting information from the UI screen, is low.

In the UI screen shown in FIG. 3, two upper layers of "classification 1" and "classification 2" are displayed in addition to the item identification information pieces. The UI configuration determining unit 10 can determine the configuration of the UI screen shown in FIG. 3 as a UI screen of a second assumed user of which the level of proficiency is higher than that of the first assumed user.

In the UI screen shown in FIG. 4, only the upper layer of "classification 1" is displayed in addition to the item identification information pieces. The UI configuration determining unit 10 can determine the configuration of the UI screen shown in FIG. 4 as a UI screen for a third assumed user of which the level of proficiency is higher than that of the second assumed user.

The UI configuration determining unit 10 may determine the configuration of the UI screen in which only the item identification information pieces are displayed as the item-relevant information and the upper layer is not displayed at all, although not shown, as a UI screen for a fourth assumed user of which the level of proficiency is higher than that of the third assumed user.

In this way, the UI configuration determining unit 10 can arrange the item identification information pieces on the UI screen in correlation with the GUI components as the item-relevant information and adjust the amount of information of the upper layers arranged on the UI screen depending on an assumed user to determine the configuration of the UI screen for the assumed user. That is, the UI configuration determining unit 10 can determine the upper layers to be arranged on the UI screen depending on an assumed user and determine the configuration of the UI screen for the assumed user.

Referring to FIG. 1 again, the input receiving unit 20 receives an input of information indicating attributes of an assumed user from the user. The information indicating attributes of an assumed user may be, for example, "information indicating a level of proficiency at a service of receiving an input of information from the UI screen" or "information indicating a level of proficiency at work of inputting information from the UI screen". This information may be, for example, information in which the level of proficiency of the assumed user is scored (for example, evaluated in five grades). In this case, the input receiving unit 20 may directly receive an input of a score indicating the level of proficiency of the assumed user from the user or may receive an input of information for calculating the score indicating the level of proficiency of the assumed user. The information for calculating the score indicating the level of proficiency of the assumed user may be information on the assumed user such as sex, age, service use time, and occupation of the assumed user. The input receiving unit 20 may calculate the score indicating the level of proficiency of the assumed user using a predetermined calculation rule stored in advance on the basis of the received information. A unit causing the input receiving unit 20 to receive the input of information is not particularly limited, and can be realized using all input devices such as a keyboard, a mouse, and a touch panel display.

The information, an input of which is received by the input receiving unit 20, indicating attributes of the assumed user is sent to the UI configuration determining unit 10. Then, the UI configuration determining unit 10 determines the configuration of the UI screen corresponding to the assumed user, for example, the upper layers to be arranged on the UI screen, on the basis of the information indicating the acquired attributes of the assumed user. For example, the UI configuration determining unit 10 may store in advance information in which the information (for example, score) indicating the level of proficiency of the assumed user and information for identifying the upper layers to be arranged on the UI screen are correlated and may determine the configuration of the UI screen corresponding to the assumed user using the information.

The UI component holding unit 30 holds data indicating the GUI components and the item-relevant information pieces to be arranged on the UI screen. For example, the UI component holding unit 30 holds the data shown in FIG. 5.

The UI creating unit 40 arranges the GUI components and predetermined item-relevant information pieces on the configuration of the UI screen determined by the UI configuration determining unit 10 using the data held in the UI component holding unit 30 and creates a UI screen. The predetermined item-relevant information pieces include item identification information pieces and information pieces on upper layers determined to be arranged on the UI screen by the UI configuration determining unit 10. As a result, the UI screens shown in FIGS. 2 to 4 are obtained.

The output unit 50 outputs the UI screen created by the UI creating unit 40, for example, through an output device such as a display. As a result, a user can view the UI screens shown in FIGS. 2 to 4.

An example of a process flow of a UI creation support method according to this embodiment will be described below with reference to the flowchart shown in FIG. 6.

Figure 6:
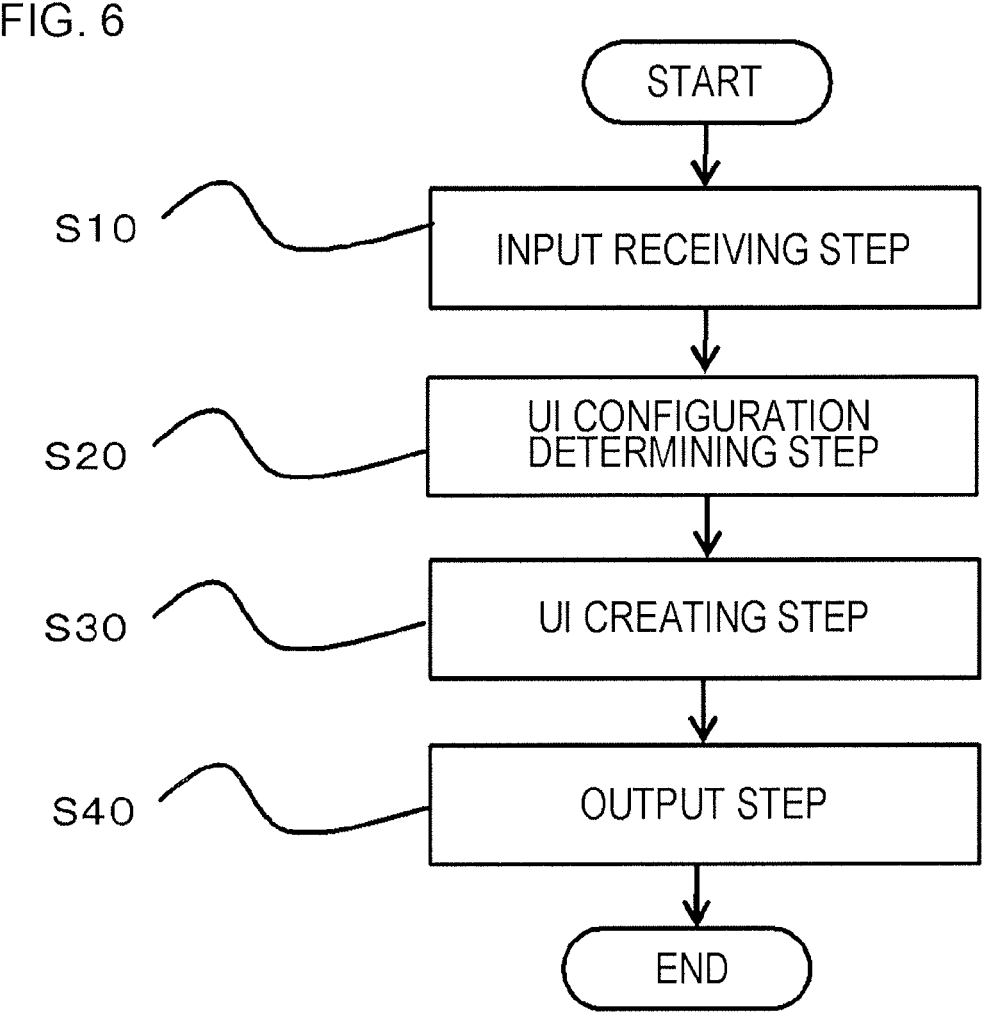
FIG. 6 is a flowchart illustrating an example of a process flow in a UI creation support method according to the embodiment.

As shown in the flowchart of FIG. 6, the UI creation support method according to this embodiment includes an input receiving step S10, a UI configuration determining step S20, a UI creating step S30, and an output step S40.

In the input receiving step S10, the input receiving unit 20 receives an input of information indicating attributes of an assumed user. For example, the input receiving unit 20 receives an input of "information indicating a level of proficiency at a service for receiving an input of information from the UI screen" (for example, evaluation in five grades).

In the UI configuration determining step S20, the UI configuration determining unit 10 determines the configuration of the UI screen for the assumed user on the basis of the information acquired by the input receiving unit 20 in S10. Specifically, the UI configuration determining unit 10 determines the configuration of the UI screen in which the GUI components and the item-relevant information pieces to be displayed in correlation with the GUI components are arranged. At this time, the UI configuration determining unit 10 adjusts the amount of item-relevant information pieces to be arranged depending on an assumed user and determines the configuration of the UI screen for the assumed user.

In the UI creating step S30, the UI creating unit 40 creates a UI screen on the basis of the configuration of the UI screen determined by the UI configuration determining unit 10 in S20 using the data, which is held in the UI component holding unit 30, indicating the GUI components and the item-relevant information pieces.

In the output step S40, the output unit 50 outputs the UI screen created by the UI creating unit 40 in S30, for example, through the display. As a result, a user can view, for example, the UI screens shown in FIGS. 2 to 4.

Thereafter, for example, an input for storing the configuration of the UI screen output in step S40 may be received from the user and the information indicating the configuration of the UI screen may be stored. The information indicating the configuration of the UI screen may be data itself of the UI screen in which the GUI components and the item-relevant information pieces are arranged, or may be the information, which is determined by the UI configuration determining unit 10 in S20, indicating the configuration of the UI screen.

The UI creation support system 1 according to this embodiment can be realized, for example, by installing the following program in a computer:

A program for supporting creation of a UI screen for receiving an input of each of a plurality of items, the program causing a computer to serve as: a UI configuration determining unit that arranges GUI components for receiving an input of each of the plurality of items and item-relevant information pieces which are information pieces relevant to the plurality of items which are displayed in correlation with the GUI components on the UI screen, that adjusts an amount of the item-relevant information pieces to be arranged on the UI screen depending on an assumed user using the UI screen, and that determines a configuration of the UI screen for the assumed user.

According to this embodiment, it is possible to determine a configuration of a UI screen suitable for an assumed user by appropriately choosing information to be displayed on the UI screen depending on the assumed user.

Second Embodiment

This embodiment is different in configuration from the first embodiment, in that it further includes a configuration for adjusting a display density (arrangement density) of the GUI components and the item-relevant information pieces on a UI screen depending on an assumed user. The other configurations are the same as described in the first embodiment. Hereinafter, the GUI components and the item-relevant information pieces are collectively referred to as UI components.

The functional block diagram illustrating an example of a configuration of a UI creation support system 1 according to this embodiment is the same as described in the first embodiment. That is, as shown in FIG. 1, the UI creation support system 1 according to this embodiment includes a UI configuration determining unit 10. The UI creation support system 1 according to this embodiment may further include an input receiving unit 20, a UI component holding unit 30, a UI creating unit 40, and an output unit 50.

The configurations of the UI configuration determining unit 10 and the UI creating unit 40 will be described below. The configurations of the input receiving unit 20, the UI component holding unit 30, and the output unit 50 are the same as described in the first embodiment and thus description thereof will not be repeated.

The UI configuration determining unit 10 adjusts the display density of UI components on a UI screen depending on an assumed user using the UI screen. As a result, the number of UI components to be simultaneously displayed on a display is adjusted.

For example, when a UI screen is a UI screen for inputting information on a predetermined service and a level of proficiency of an assumed user at the predetermined service, particularly, a level of proficiency at work of inputting information from the UI screen, is low, the UI configuration determining unit 10 determines a configuration of the UI screen in which the display density of UI components is small as the UI screen for the assumed user. Accordingly, the amount of information to be simultaneously displayed on a display is reduced. As a result, a user manipulating the UI screen can easily understand the displayed information, thereby enhancing processing efficiency or correctness.

On the other hand, when a UI screen is a UI screen for inputting information on a predetermined service and a level of proficiency of an assumed user at the predetermined service, particularly, a level of proficiency at work of inputting information from the UI screen, is high, the UI configuration determining unit 10 determines a configuration of the UI screen in which the display density of UI components is large as the UI screen for the assumed user. Accordingly, the amount of information to be simultaneously displayed on a display is increased, but the size of the UI screen can be reduced. In this case, it is possible to reduce the amount of scroll display operation. Particularly, when the overall UI screen is simultaneously displayed on the display, the scroll display operation is unnecessary. As a result, it is possible to enhance processing efficiency of an input of predetermined information through the UI screen.

The adjusting of the display density of the UI components on the UI screen can be realized, for example, by changing an arrangement rule of the UI components on the UI screen. The UI configuration determining unit 10 may determine the configuration of the UI screen for an assumed user by determining the arrangement rule of the UI components on the UI screen depending on the assumed user.

The details of the arrangement rule of the UI components are not particularly limited, but examples thereof include a rule of defining the maximum number of UI components capable of being arranged in the same row on the UI screen, a rule of defining an interval between the UI components in the row direction on the UI screen, a rule of defining the intervals between the UI components in the row direction and the column direction, and a rule in which at least two rules of the above-mentioned rules are combined. For example, the specific values in the rules are design matters. For example, the UI configuration determining unit 10 may select one value out of predetermined plural candidate values depending on an assumed user. The above-mentioned rules are only examples, and other rules may be used as long as they can adjust the display density of the UI components.

Here, examples of a UI screen in which plural UI components are arranged in accordance with different arrangement rules are shown in FIGS. 7 to 9. The UI screens shown in FIGS. 7 to 9 are displayed on a display.

The UI screen shown in FIG. 7 is a UI screen (hereinafter, referred to as a "first UI screen") in which the overall UI screen is simultaneously displayed on the display. That is, a scroll bar is not displayed in the first UI screen shown in FIG. 7. The UI configuration determining unit 10 can determine an arrangement rule of simultaneously displaying the overall UI screen on a display, like the first UI screen shown in FIG. 7, depending on an assumed user. The details of the arrangement rule of the first UI screen are not particularly limited, as long as a configuration in which the overall UI screen is simultaneously displayed on a display can be realized.

The UI screens shown in FIGS. 8 and 9 are UI screens (hereinafter, referred to as a "second UI screen") in which the display density of the UI components is set to be smaller than the display density of the UI components in the first UI screen. The second UI screen shown in FIGS. 8 and 9 is configured to be displayed in a scrolling manner by manipulating a scroll bar.

The arrangement rules of the second UI screens shown in FIGS. 8 and 9 are smaller in the maximum number of UI components capable of being arranged in the same row than the arrangement rule of the first UI screen shown in FIG. 7. As a result, the second UI screens shown in FIGS. 8 and 9 are smaller in the display density of UI components than the first UI screen shown in FIG. 7 and thus the number of UI components simultaneously displayed on the display is also smaller. The second UI screen shown in FIG. 9 is smaller in the display density of UI components than the second UI screen shown in FIG. 8 and thus the number of UI components simultaneously displayed on the display is also smaller. That is, the arrangement rule of the second UI screen shown in FIG. 9 is smaller in the maximum number of UI components capable of being arranged in the same row than the arrangement rule of the second UI screen shown in FIG. 8.

The UI configuration determining unit 10 can determine an arrangement rule in which the display density of UI components is smaller than the display density of UI components on the first UI screen, like the second UI screens shown in FIGS. 8 and 9, depending on an assumed user. The arrangement rules of the second UI screens have only to realize the configuration in which the display density of UI components is smaller than the display density of UI components on the first UI screen, and the arrangement rule described with reference to FIGS. 8 and 9 are only examples.

The UI configuration determining unit 10 according to this embodiment determines the configuration of a UI screen for an assumed user by adjusting the amount of item-relevant information pieces to be arranged on the UI screen as described in the first embodiment and adjusting the display density of UI components on the UI screen as described above depending on the assumed user.

The UI creating unit 40 according to this embodiment arranges the UI components to create a UI screen on the basis of the configuration of the UI screen determined by the UI configuration determining unit 10 using the UI components held by the UI component holding unit 30.

The process flow of a UI creation support method according to this embodiment can be realized similarly to the first embodiment. Accordingly, description thereof will not be repeated.

According to this embodiment, it is possible to achieve the same operational advantages as the first embodiment. According to this embodiment, it is possible to determine a configuration of a UI screen suitable for an assumed user by adjusting an amount of information to be simultaneously displayed on a display depending on the assumed user.

Third Embodiment

This embodiment is different from the configurations of the first and second embodiments, in that it further includes a configuration in which a UI screen is divided into plural pages and UI components are displayed in the plural pages depending on an assumed user. The other configurations are the same as described in the first and second embodiments.

The functional block diagram illustrating an example of a configuration of a UI creation support system 1 according to this embodiment is the same as described in the first and second embodiments. That is, as shown in FIG. 1, the UI creation support system 1 according to this embodiment includes a UI configuration determining unit 10. The UI creation support system 1 according to this embodiment may further include an input receiving unit 20, a UI component holding unit 30, a UI creating unit 40, and an output unit 50.

The configurations of the UI configuration determining unit 10 and the UI creating unit 40 will be described below. The configurations of the input receiving unit 20, the UI component holding unit 30, and the output unit 50 are the same as described in the first and second embodiments and thus description thereof will not be repeated.

Similarly to the second embodiment, the UI configuration determining unit 10 can determine the configuration of the first UI screen in which the overall UI screen is simultaneously displayed on a display shown in FIG. 7 depending on an assumed user as a configuration of a UI screen for the assumed user.

The UI configuration determining unit 10 determines the configuration of the UI screen (hereinafter, referred to as a "third UI screen") employing a display method of dividing the UI screen into plural pages and sequentially displaying the plural pages on the display depending on an assumed user. That is, the UI components are arranged in plural pages and the UI components are sequentially arranged on the display every predetermined number. As a result, the number of UI components to be simultaneously displayed on the display is adjusted.

For example, when a UI screen is a UI screen for inputting information on a predetermined service and a level of proficiency of an assumed user at the predetermined service, particularly, a level of proficiency at work of inputting information from the UI screen, is low, the UI configuration determining unit 10 determines a configuration in which the UI screen is divided into more pages as the UI screen for the assumed user. Accordingly, the amount of information to be simultaneously displayed on a display is reduced. As a result, a user manipulating the UI screen can easily understand the displayed information, thereby enhancing processing efficiency or correctness.

On the other hand, when a UI screen is a UI screen for inputting information on a predetermined service and a level of proficiency of an assumed user at the predetermined service, particularly, a level of proficiency at work of inputting information from the UI screen, is high, the UI configuration determining unit 10 determines a configuration in which the UI screen is divided into less pages, for example, a configuration of a UI screen including only one page, as the UI screen for the assumed user. Accordingly, the amount of information to be simultaneously displayed on a display is increased, but the amount of page switching operation can be reduced. Particularly, when the UI screen is constructed by only one page, the page switching operation is unnecessary. As a result, it is possible to enhance processing efficiency of an input of predetermined information through the UI screen.

Into what pages to divide the first UI screen and how to distribute the designed UI components to the pages are design matters.

Figure 10B:
FIG. 10(b) is a diagram illustrating an example of a UI screen realized by the UI creation support system according to the embodiment.
Figure 11A:
FIG. 11(a) is a diagram illustrating an example of a UI screen realized by the UI creation support system according to the embodiment.
Figure 11D:
FIG. 11(d) is a diagram illustrating an example of a UI screen realized by the UI creation support system according to the embodiment.

Examples of the configuration of the third UI screen are shown in FIGS. 10(*a*) to 10(*c*) and FIGS. 11(*a*) to 11(*f*). A UI screen corresponding to the first UI screen shown in FIG. 7 is constructed by three pages shown in FIGS. 10(*a*) to 10(*c*). A UI screen corresponding to the first UI screen shown in FIG. 7 is constructed by six pages shown in FIGS. 11(*a*) to 11(*f*).

In the third UI screen shown in FIGS. 10(*a*) to 10(*c*), the first UI screen shown in FIG. 7 is divided into the information units of classification 1 (see FIG. 5) of "basic information", "requester information", and "delivery destination person" and each information unit is displayed in a single page. These plural pages are displayed on the display in a predetermined order in response to an input of buttons of "to next page" and "to previous page" disposed in each page. The arrangement method of UI components on the third UI screens shown in FIGS. 10(*a*) to 10(*c*), that is, the number of UI components or the interval between the UI components arranged in the same row, is the same as the first UI screen shown in FIG. 7, but may be adjusted on the basis of the second embodiment.

In the third UI screen shown in FIGS. 11(*a*) to 11(*f*), each page of the UI screen shown in FIGS. 10(*a*) to 10(*c*) is further divided into two pages. Similarly, these plural pages are also displayed on the display in a predetermined order in response to an input of buttons of "to next page" and "to previous page" disposed in each page. The arrangement method of UI components on the third UI screens shown in FIGS. 11(*a*) to 11(*f*), that is, the number of UI components or the interval between the UI components arranged in the same row, is the same as the first UI screen shown in FIG. 7, but may be adjusted on the basis of the second embodiment.

The UI configuration determining unit 10 according to this embodiment determines a configuration of a UI screen for an assumed user by adjusting an amount of information of item-relevant information pieces to be arranged on the UI screen as described in the first embodiment and adjusting pages of the UI screen as described above, depending on the assumed user. The UI configuration determining unit 10 according to this embodiment may determine a configuration of a UI screen for an assumed user by adjusting a display density of UI components on the UI screen depending on the assumed user as described in the second embodiment.

The UI creating unit 40 according to this embodiment arranges the UI components on the basis of the configuration of the UI screen determined by the UI configuration determining unit 10 using the UI components held in the UI component holding unit 30 and creates a UI screen.

The process flow of a UI creation support method according to this embodiment can be realized similarly to the first embodiment. Accordingly, description thereof will not be repeated.

According to this embodiment, it is possible to achieve the same operational advantages as the first and second embodiments.

Priority is claimed on Japanese Patent Application No. 2011-015240, filed on Jan. 27, 2011, the content of which is incorporated herein by reference.

The invention claimed is:

1. A user interface (UI) creation support system that supports creating a UI screen for receiving an input of each of a plurality of items, the UI creation support system comprising:
   a processing unit including a CPU;
   a UI configuration determining unit that arranges graphical user interface (GUI) components for receiving an input of each of the plurality of items and item-relevant information pieces which are information pieces relevant to the plurality of items which are displayed in correlation with the GUI components on the UI screen, that adjusts an amount of the item- relevant information pieces to be arranged on the UI screen depending on an assumed user using the UI screen, and that determines a configuration of the UI screen for the assumed user, wherein the item-relevant information pieces have a hierarchical structure including a lower layer having item identification information pieces for identifying the plurality of items and at least one upper layer having a plurality of groups into which the item identification information pieces are classified, and wherein the UI configuration determining unit arranges the item identification information pieces on the UI screen and adjusts an amount of information of the upper layer to be arranged on the UI screen, wherein the UI screen is a UI screen for inputting information on a predetermined service, and wherein the UI configuration determining unit increases an amount of the item-relevant information pieces to be arranged on the UI screen when a level of proficiency of the assumed user at the predetermined service is low, and decreases the amount of the item-relevant information pieces to be arranged on the UI screen when the level of proficiency of the assumed user at the predetermined service is high, wherein the amount of the item-relevant information pieces includes information about the upper layer of the hierarchical structure having the plurality of groups.

2. The UI creation support system according to claim 1, wherein the UI configuration determining unit determines a configuration of the UI screen in which the item identification information pieces are arranged and the information of the upper layer is not arranged at all as a configuration of the UI screen for a first assumed user, and determines a configuration of the UI screen in which the item identification information pieces are arranged and the information of the at least one upper layer is arranged as a configuration of the UI screen for a second assumed user.

3. A UI creation support method of supporting creation of a UI screen for receiving an input of each of a plurality of items, the UI creation support method comprising:

a UI configuration determining step of arranging GUI components for receiving an input of each of the plurality of items and item-relevant information pieces which are information pieces relevant to the plurality of items which are displayed in correlation with the GUI components on the UI screen, adjusting an amount of the item-relevant information pieces to be arranged on the UI screen depending on an assumed user using the UI screen, and determining a configuration of the UI screen for the assumed user, wherein the item-relevant information pieces have a hierarchical structure including a lower layer having item identification information pieces for identifying the plurality of items and at least one upper layer having a plurality of groups into which the item identification information pieces are classified, and wherein the UI configuration determining unit arranges the item identification information pieces on the UI screen and adjusts an amount of information of the upper layer to be arranged on the UI screen, wherein the UI screen is a UI screen for inputting information on a predetermined service, and wherein the UI configuration determining unit increases an amount of the item-relevant information pieces to be arranged on the UI screen when a level of proficiency of the assumed user at the predetermined service is low, and decreases the amount of the item-relevant information pieces to be arranged on the UI screen when the level of proficiency of the assumed user at the predetermined service is high, wherein the amount of the item-relevant information pieces includes information about the upper layer of the hierarchical structure having the plurality of groups.

4. An non-transitory storage medium storing a program for supporting creation of a UI screen for receiving an input of each of a plurality of items, the program causing a computer to serve as:

a UI configuration determining unit that arranges GUI components for receiving an input of each of the plurality of items and item-relevant information pieces which are information pieces relevant to the plurality of items which are displayed in correlation with the GUI components on the UI screen, that adjusts an amount of the item-relevant information pieces to be arranged on the UI screen depending on an assumed user using the UI screen, and that determines a configuration of the UI screen for the assumed user, wherein the item-relevant information pieces have a hierarchical structure including a lower layer having item identification information pieces for identifying the plurality of items and at least one upper layer having a plurality of groups into which the item identification information pieces are classified, and wherein the UI configuration determining unit arranges the item identification information pieces on the UI screen and adjusts an amount of information of the upper layer to be arranged on the UI screen, wherein the UI screen is a UI screen for inputting information on a predetermined service, and wherein the UI configuration determining unit increases an amount of the item-relevant information pieces to be arranged on the UI screen when a level of proficiency of the assumed user at the predetermined service is low, and decreases the amount of the item-relevant information pieces to be arranged on the UI screen when the level of proficiency of the assumed user at the predetermined service is high, wherein the amount of the item-relevant information pieces includes information about the upper layer of the hierarchical structure having the plurality of groups.

* * * * *